United States Patent [19]

Lurtz

[11] 4,206,322
[45] Jun. 3, 1980

[54] TIME-DIVISION SWITCHING SYSTEM FOR MULTIRATE DATA

[75] Inventor: John W. Lurtz, Naperville, Ill.

[73] Assignee: Bell Telephone Laboratories, Incorporated, Murray Hill, N.J.

[21] Appl. No.: 945,546

[22] Filed: Sep. 25, 1978

[51] Int. Cl.² .............................................. H04J 3/16
[52] U.S. Cl. ....................................... 370/63; 370/56; 370/66; 370/84
[58] Field of Search ......... 179/15 BV, 15 AT, 18 ES, 179/15 AQ

[56] References Cited

U.S. PATENT DOCUMENTS

| Re. 29,215 | 5/1977 | Carney | 179/15 BV |
|---|---|---|---|
| 3,924,081 | 12/1975 | Rohrig | 179/18 ES |
| 3,987,251 | 10/1976 | Texler | 179/15 BV |
| 3,988,544 | 10/1976 | Texler | 179/15 BV |
| 3,988,545 | 10/1976 | Kummerle | 179/15 BV |

*Primary Examiner*—David L. Stewart
*Attorney, Agent, or Firm*—Kenneth H. Samples

[57] ABSTRACT

A time-division switching system for switching data words from data word sources received in channels of a time-multiplex line where a first plurality of data word sources uses a channel only once every n channels and a second plurality of data word sources uses a channel once every m channels where m is less than n and n is not an integer multiple of m. The switching system operates in response to control words sequentially provided by a control word source. The control word source of the disclosed embodiment comprises a first storage arrangement having n storage locations for storing control words and a second storage arrangement having m storage locations for storing control words. A storage reading circuit substantially simultaneously reads the contents of one storage location of both storage arrangements sequentially. A selection arrangement receives the control words from the storage reading circuit and transmits a predetermined one of the two control words so read to the time-division switching system for control thereof.

9 Claims, 9 Drawing Figures

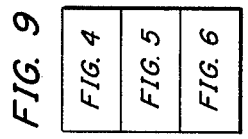
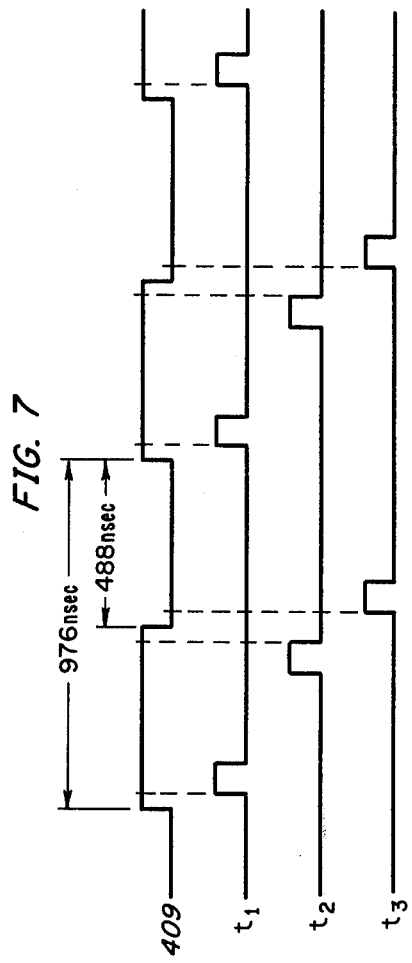
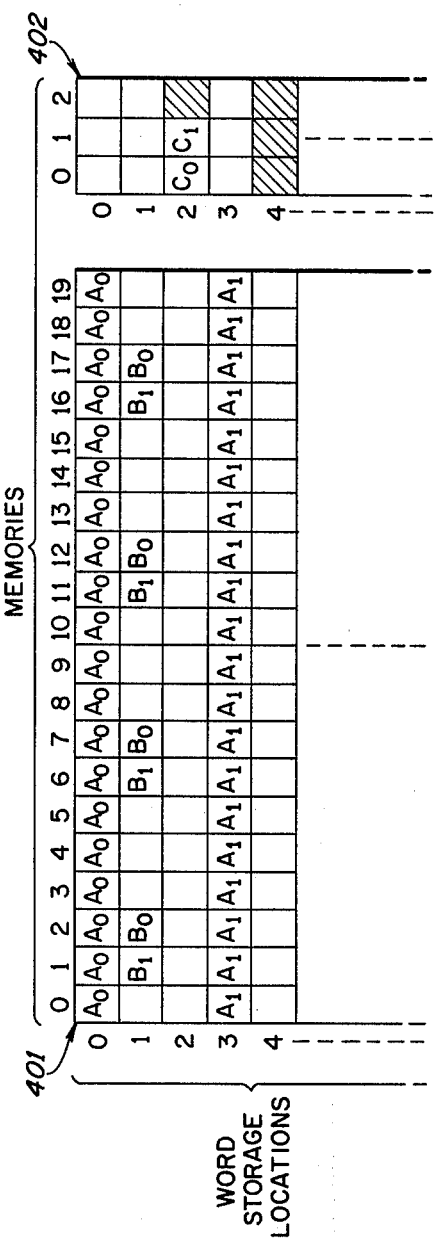

TIME-DIVISION SWITCHING SYSTEM FOR MULTIRATE DATA

This invention relates to time-division switching systems and, more particularly, to such systems which are designed to switch digital data having a multiplicity of data rates.

Digital time-division switching systems switch information bearing data words among a plurality of subscribers (or data sources) associated with the switching system. Digital data words are received from the individual subscribers at fixed periodic time intervals determined by the data rates of those subscribers. The fixed periodic time interval between data words from a given data word source is referred to herein as the data period of that source. Frequently, the data words are received from the subscribers in time-separated channels on at least one time-division multiplex line. J. W. Lurtz, U.S. Pat. No. 4,035,584, issued July 12, 1977, describes a system having a plurality of time-multiplex lines in which each line has 128 time-separated channels and the time interval between channels associated with the same subscriber is 125 microseconds.

In order to switch the subscribers' information time-division switching systems generally function in repetitive time slots of fixed duration. During each time slot a data word from one (or more) subscriber is switched to the subscriber (or subscribers) defined by a control word associated with that time slot. It is essential that the data words from a given subscriber be switched with the same temporal spacing that they are received to avoid transmitting inaccurate data. For example, if data words are received by the system from a given subscriber with the data period of one data word every 125 microseconds, then these data words must be switched at the same data rate. The control words which control the switching system are typically stored by the switching system as at least one list, each list being accessed in a predetermined sequence at the rate of one control word per list per time slot. Since each control word list is repetitively accessed, the proper temporal spacing must exist both throughout the control word list and throughout the control word sequence produced by repetitively accessing that list.

Some switching systems switch only data words from subscribers having the same data period. When all subscribers have the same data period, the time between data words from a given subscriber is equal and is called a frame. A switching system of the type referred to immediately above, which does not provide expansion or concentration, will generally have a control word list with the same number of control words as there are channels per time multiplexed frame. Some switching systems permit subscribers having different data periods to be switched if all subscribers have a data period which is an integer divisible of the data period of the slowest data source. In this type of switching system, assuming no expansion or concentration, the control word list storage capacity must be sufficient to store a number of control words equal to the product of the number of channels per frame times the number of frames between successive data words from the slowest subscriber. For example, in a system having 128 channels per frame, if the incoming data periods of one channel per five frames, one channel per ten frames, and one channel per twenty frames are all to be switched, a control word storage arrangement must be capable of storing 2,560 control words (128 times 20). The switching system thus, effectively extends the time multiplexed frame to 2,560 channels which is sometimes referred to as a super frame.

A system having 2,560 control words is not adequate to switch the subrate data of our example if a subscriber having the rate of one channel every three frames is also included. In a repetitive cycle of twenty frames of control words, no control word storage location can be used to store control words which will always be three frames apart. This occurs since the division of twenty by three does not yield an integer. An extension of the above-mentioned solution would require a control word storage arrangement having the capacity for 7,680 control words. The present invention can be employed to switch data at the above-mentioned data rates while requiring a number of control word storage locations far less than the 7,680 otherwise required.

SUMMARY OF THE INVENTION

The environment of the present invention is a time-division switching system which switches data words between a number of digital data word sources. These digital data word sources may include digital processing equipment and telephone voice subscribers whose analogue signals have been converted to digital form. A first plurality of data sources have data rates which require the use of one channel every n channels and a second plurality of data sources have data rates which require the use of one channel every m channels where m is less than n, and n is not an integer multiple of m. A control word source in accordance with the present invention comprises a first storage arrangement having n storage locations for storing control words and a second storage arrangement having m storage locations for storing control words. A storage reading circuit substantially simultaneously reads the contents of one storage location of each storage arrangement. A selection arrangement receives control words from the storage reading circuit and transmits a predetermined one of the two control words so read to the time-division switching system for the control thereof.

In one particular embodiment of the invention, 2.4 kilobit per second subscribers utilize one channel out of every 2,560 (twenty frames of 128 channels) and 16 kilobit per second subscribers utilize one channel out of every 384 channels (three frames of 128 channels). In this embodiment, a first control word storage arrangement includes 2,560 storage locations for control words for association with the 2.4 kilobit per second subscribers and a second storage arrangement includes 384 storage locations for storing control words for association with the 16 kilobit per second subscribers. All storage locations of both storage arrangements comprise a control portion and an associated busy/idle portion which defines if the associated control portion is valid or not. The storage locations of both storage arrangements are read in sequence in such a manner that one control word is read from both storage arrangements substantially simultaneously, however, only a control word having a busy/idle portion indicating the associated control portion to be valid will be transmitted to the time-division switching system.

BRIEF DESCRIPTION OF THE DRAWINGS

The following description of the embodiment of the invention will be more readily understood when read in conjunction with the drawing wherein:

FIGS. 2 and 7 are timing diagrams helpful in understanding the embodiment;

FIGS. 3 and 8 are detailed drawings of the contents of certain memories in the present embodiment.

DESCRIPTION

Figure 1:
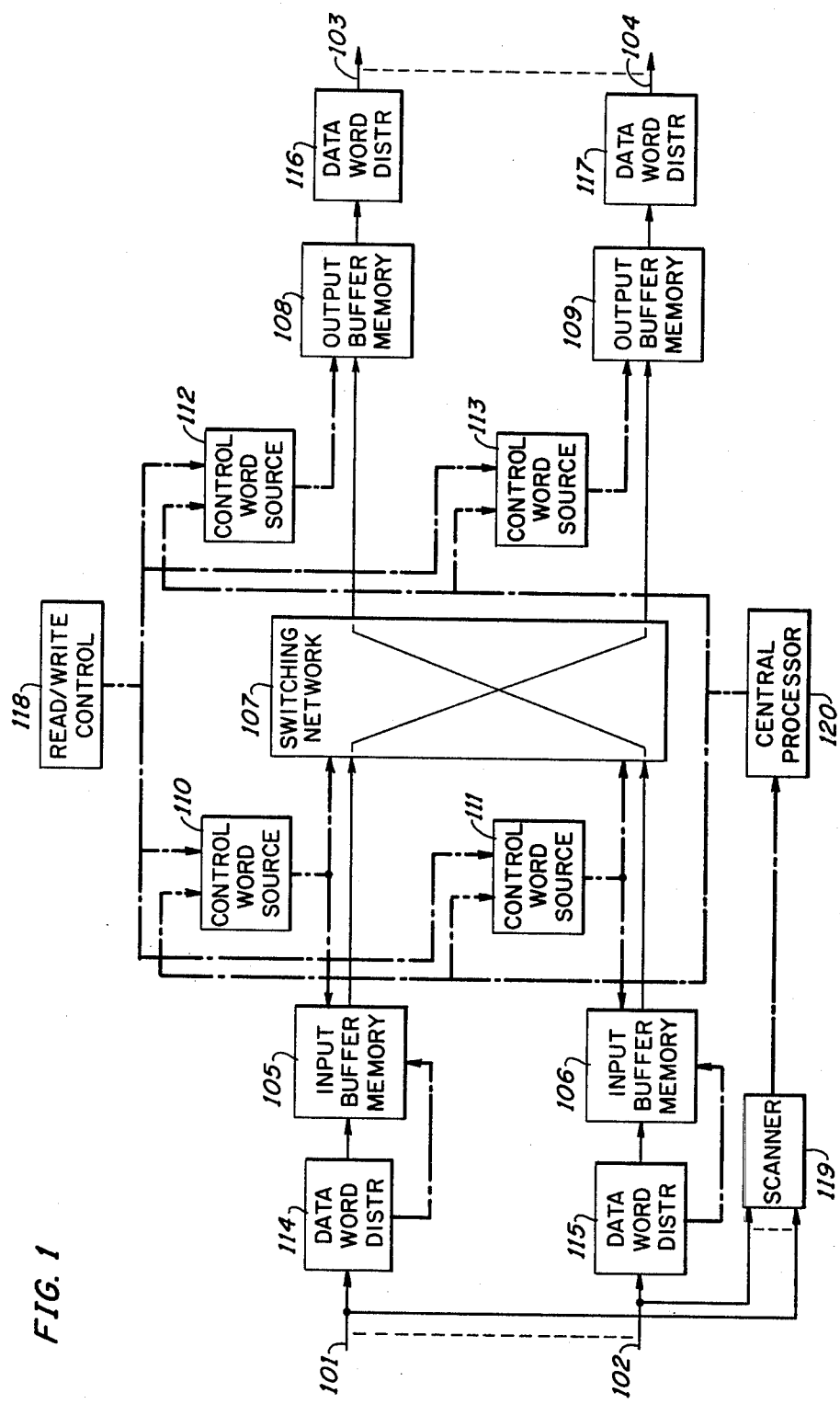
FIG. 1 is a general block diagram of an embodiment in the present invention.

FIG. 1 shows a time-division switching system including a plurality of incoming time-multiplex lines of which time-multiplex lines 101 and 102 are shown and a plurality of outgoing time-multiplex lines of which time-multiplex lines 103 and 104 are shown. Each of the incoming time-multiplex lines conveys digital data in 125-microsecond frames of 128 time-separated channels. Accordingly, the time period of a single time-separated channel is approximately 976 nanoseconds. Data words transmitted in any given channel comprise seven information digits and one control digit. The maximum information capacity of one channel per frame accordingly is 56 kilobits per second $$(7 \text{ bits} \times \frac{1}{125 \text{ microseconds}})$$

The present embodiment also accommodates subscribers having slower data rates such as 2.4 kilobits per second, 4.8 kilobits per second, 9.6 kilobits per second, and 16 kilobits per second. Subscribers having slower data rates, less than 56 kilobits per second, are referred to herein as subrate subscribers. For the sake of system efficiency, certain subrate subscribers share one of the 56 kilobit per second data channels. It should be noted that when subscribers share a channel, one of the seven information digits is required for subscriber identification leaving six digits for data. This results in a maximum capacity for one channel per frame of 48 kilobits per second. The following table shows the number of subscribers of particular data rates which can share a channel:

| Data Rate (Kilobits per Second) | Maximum Number of Sharing Subscribers (s) |
| --- | --- |
| 2.4 | 20 |
| 4.8 | 10 |
| 9.6 | 5 |
| 16.0 | 3 |

Figure 2:
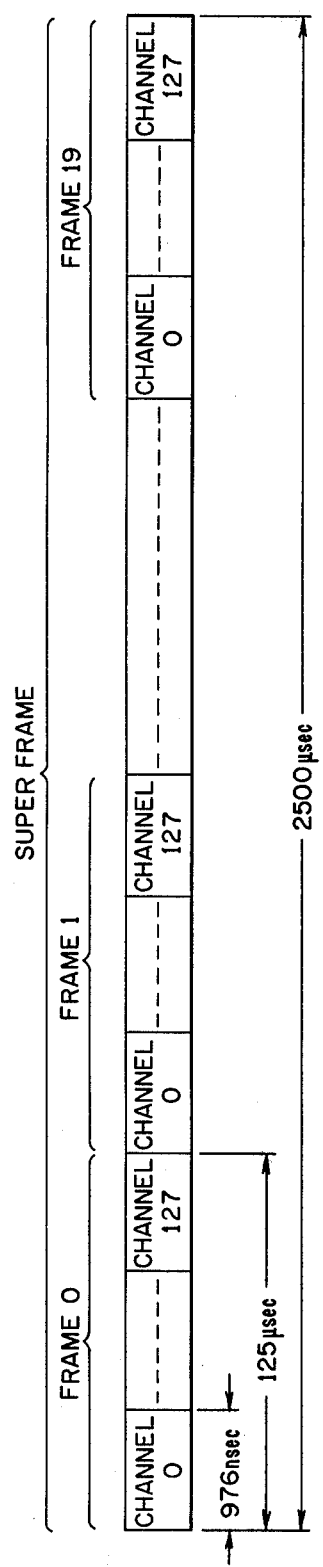

Subrate subscribers share a channel by using it once every s frames where s equals the maximum number of subscribers sharing the channel. Accordingly, the number of channels between successive usages by the same subrate subscriber in the present embodiment is 128 times the maximum number of subscribers sharing the channel. For example, a 2.4 kilobit subscriber will make use of its associated channel every twentieth frame or every 2,560 channels. The process of channel sharing in the present embodiment can be conceptualized by reference to a "super frame" which comprises 2,560 time-separated channels every 2,500 microseconds (FIG. 2). The length of the super frame is the product of the number of channels per frame and the repetition rate of the slowest subrate subscriber (128 channels per frame times 20 frames). Within a super frame each subscriber has at least one associated channel. For example, if channel 127 is used by a 9.6 kilobit per second subscriber, data words from that subscriber will be in channel 127 every fifth frame. Accordingly, this customer will use channel 127 four times per super frame. A 2.4 kilobit per second customer, however, will use its associated channel only once per super frame. An arrangement for multiplexing subscribers' data words onto a time-multiplexed line of the present type is disclosed in A. C. Carney et al., U.S. Pat. No. 3,794,768, of Feb. 26, 1974.

The time-division switching system of FIG. 1 is a time-space-time system comprising sixteen input buffer memories of which input buffer memories 105 and 106 are shown, a time-shared space-division switch 107 having sixteen input ports and sixteen output ports, and sixteen output buffer memories of which output buffer memories 108 and 109 are shown. In the present embodiment, each incoming time-multiplex line, e.g., 101, is uniquely associated with one input buffer memory, e.g., 105, and each output time-multiplex line, e.g., 103, is uniquely associated with one output buffer memory, e.g., 108. Further, each subscriber utilizing a given time-multiplex line is uniquely associated with a single storage location in the buffer memory associated with that time-multiplex line. Each input and output buffer memory comprises 2,560 storage locations (128 times 20) which is equal to the maximum number of subscribers which can make use of a given time-multiplex line in the present embodiment. Each data word received on each incoming time-multiplex line is written into its associated input buffer memory at its associated storage location, defined by an input data word distributor 114. In FIg. 1 input time-multiplex line 101 is associated with input data word distributor 114 and input time-multiplex line 102 is associated with input data word distributor 115. The operation of the input data word distributors will be described in greater detail later herein.

Each of the sixteen input buffer memories is connected to one of the sixteen input ports of time-shared space-division switch 107. Data words are read from the input buffer memories, transmitted to the associated input port of space-division switch 107, and switched by the space-division switch 107 to selected output buffer memories in recurring time slots of approximately 976 nanoseconds. It should be noted that the system of the present embodiment is capable of simultaneously reading one data word from each input buffer memory and switching the resulting data words through space-division switch 107 every time slot. In a given time slot, the particular data word read from a given input buffer memory, and the path through space-division switch 107 that the particular data word will take is determined by control words from an input control word source. The present embodiment includes sixteen input control word sources of which input control word sources 110 and 111 are shown in FIG. 1 in association with input buffer memories 105 and 106, respectively.

The embodiment further includes sixteen output control word sources, one of which is uniquely associated with each output buffer memory. In the present embodiment, output buffer memories 108 and 109 are associated with output control word sources 112 and 113, respectively. Each output control word source operates in synchronism with the switching network and generates an address defining which storage location of its associated output buffer memory is to store the data word emerging from the output port of space-division switch 107. Data words stored in output buffer memories 108 and 109 are read therefrom in unique channels on the outgoing time-multiplex lines 103 and 104 by data word distributors 116 and 117, respectively.

As previously stated, data words from a given subscriber are received by the input buffer memories at a regular periodic rate determined by the data rate of the particular subscriber. It is therefore necessary to read the data words associated with that subscriber from the input buffer memories at the same rate. To this end, control words including memory addresses for reading storage locations associated with a given subscriber must be generated by the control word sources at the same rate that the data is written into the input buffer memory. One method of generating control words is to store a list of control words and to repetitively access the stored list in sequence at the rate of one control word per time slot. When, as in the present embodiment, the time period of a channel equals a time slot it is essential in the production of the control word sequence that the same number of control words exist between successive ones of a given subscriber's control words as there are channels between successive channels associated with that subscriber.

Figure 3:
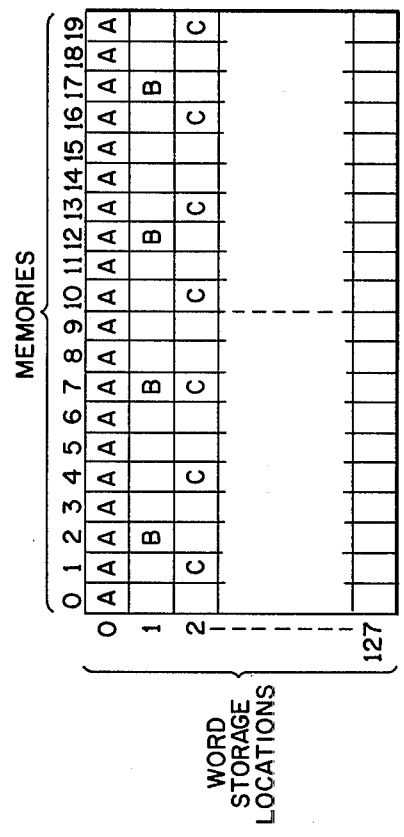

When the data periods of all possible subrate subscribers are integer divisibles of the data period of the slowest data rate, a control word sequence equal to the length of a super frame maintains the required spacing of control words. However, if a subrate subscriber has a data rate which is not an integer divisible of the data period of the slowest data rate, a super frame of control words is no longer adequate. FIG. 3 shows an arrangement for producing a sequence of control words which illustrates this situation. The control word list is stored in twenty memories of 128 storage locations each. In FIG. 3 each vertical column corresponds to a memory and each row corresponds to a particular storage location within all memories. This list is accessed by sequentially reading the 128 control word locations in the first memory followed by the sequential reading of the control word locations of each succeeding memory in sequence. When the last control word location of the last memory has been read, the sequence is repeated by reading the entire list of control words starting with the first control word of the first memory. In the course of the following discussion, statements are made regarding the number of control words separating two control words. Since the control words are accessed at the rate of one control word per time slot, the number of control words between two given control words can be considered to be the number of time slots between those control words. In accordance with FIG. 3, 128 control word locations (128 time slots) exist between a given control word location in a first memory and that same control word location in the immediately subsequent memory. In the present embodiment, a 56 kilobit subscriber requires one channel of each 128 channel frame. Accordingly, control words associated with a 56 kilobit customer are stored in the same control word location in all memory modules so that it will be accessed every 128 time slots. FIG. 3 shows the manner of storage of control words (A) for a 56 kilobit subscriber. Control word A is stored in the 0th control word location of all twenty memory modules. The 1th control word locations are used to show control word storage for a 9.6 kilobit per second data rate subscriber (B). Each control word B is exactly 640 control words (time slots) separated from the immediately succeeding control word B which corresponds to the number of channels between data words from the associated 9.6 kilobit per second subscriber. Accordingly, each control word B will be read at the same rate that data words from subscriber B are entered into the input buffer memories. The control word sequence storage arrangement of FIG. 3 is also capable of proper control word separation for the data rates of 4.8 kilobits per second and 2.4 kilobits per second in a similar manner. It should be noted that data periods of the rates of 4.8 and 9.6 kilobits per second are both integer divisibles of the data period of the rate of 2.4 kilobits per second.

In FIG. 3 control words C represent control words associated with a 16 kilobit customer which, as discussed above, transmits data words to input buffer memories one out of every three frames, that is, 384 channels separate successive usages by a 16 kilobit per second subrate subscriber. Accordingly, the sequence shown in the control word locations numbered 2 may be attempted to provide the appropriate switching control. As shown in FIG. 3, this gives a 384 control word (time slot) separation between control words C across the control word store. However, when the sequence starts over, i.e., when memory 0 is accessed after the memory 19, there are only 256 control words (time slots) between control words C. The problem cannot be solved using control word store having only one super frame of control words. One solution to the problem is the creation of a control word list based on the "lowest common denominator" of the various data rates. In the present example, this would require sixty memory modules for a total of 7,680 control word storage locations.

Figure 4:
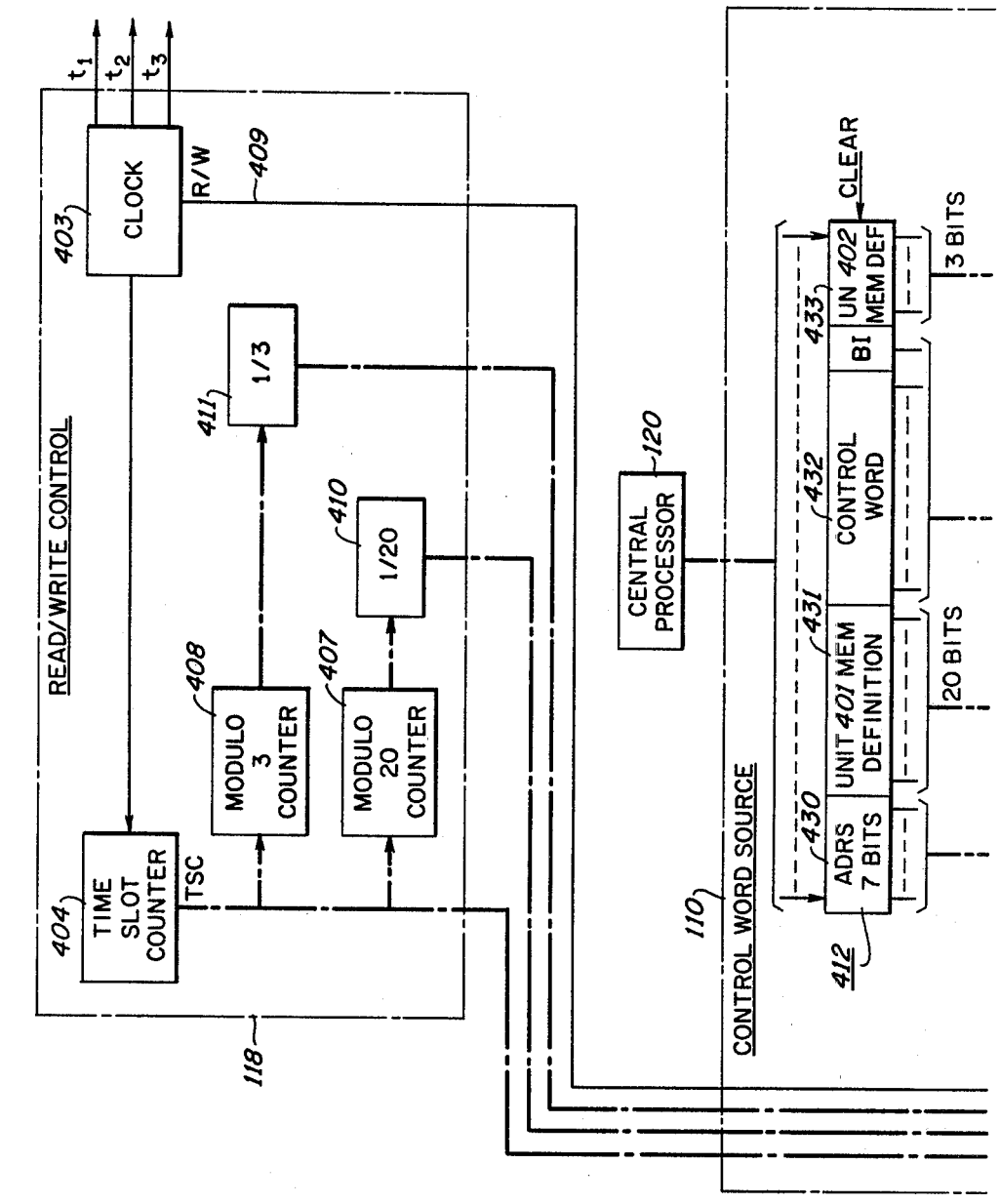
FIGS. 4, 5, and 6 when arranged in accordance with FIG. 9 form a more detailed drawing of the embodiment described.
Figure 5:
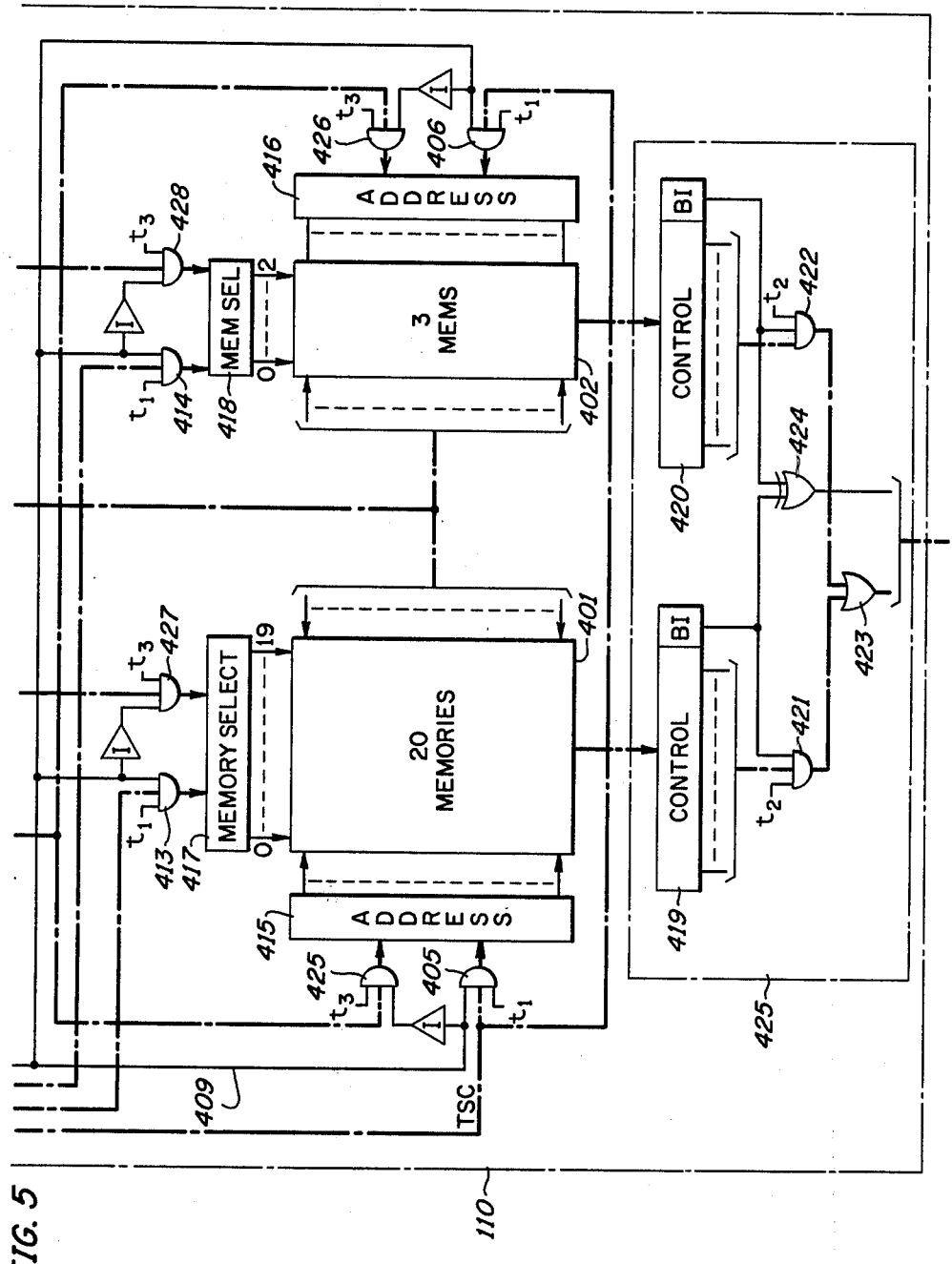
Figure 6:
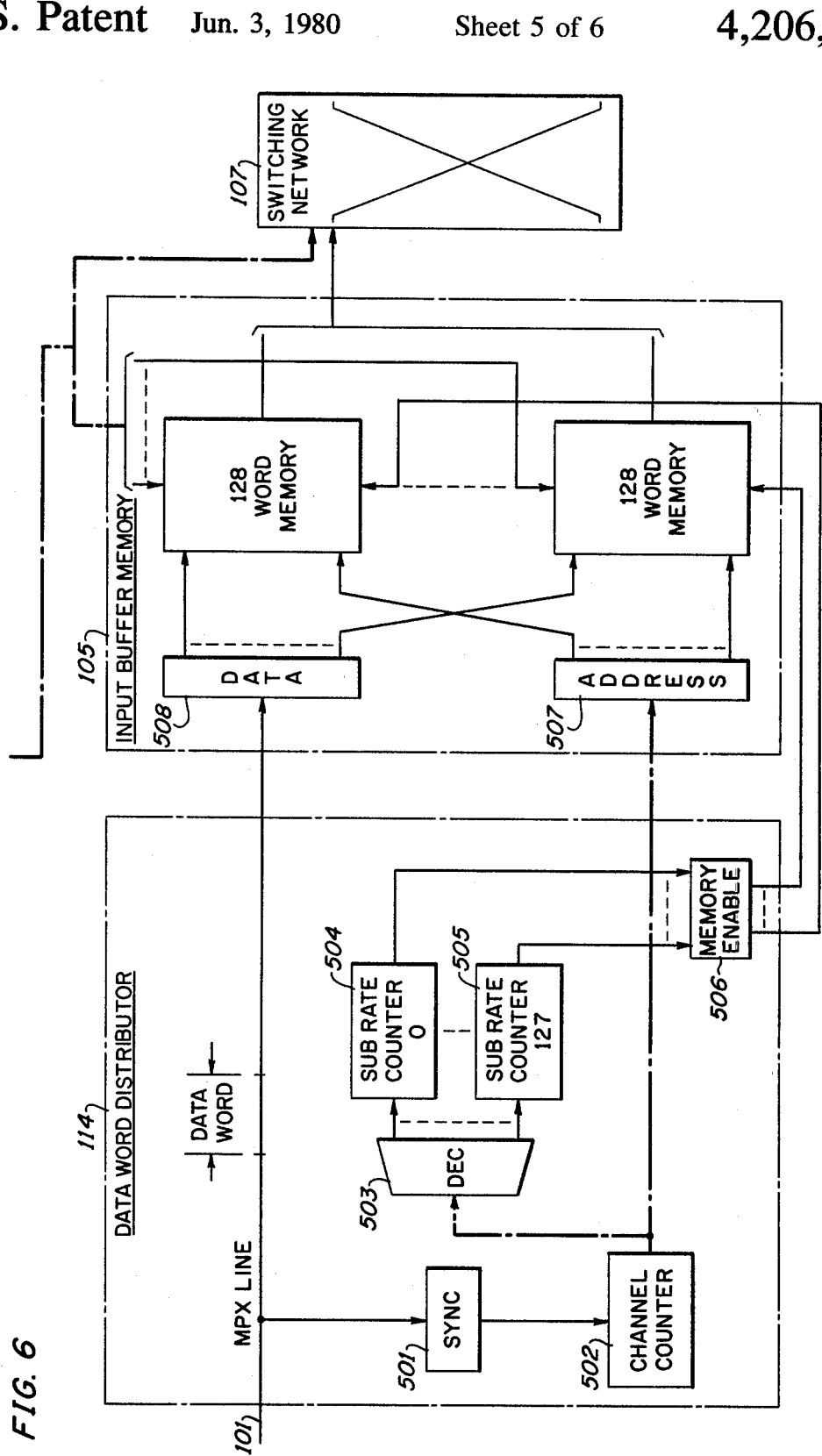

FIGS. 4, 5, and 6, arranged as shown in FIG. 9, show an embodiment of the present invention which avoids the use of such a large number of control word storage locations to provide switching control for systems which combine data rates of 2.4, 4.8, 9.6, 16, and 56 kilobits per second. This embodiment includes an input control word source 110. It should be noted that all control word sources e.g., 111, 112, and 113 are substantially the same except that the length of the control word generated thereby varies. Two separate control word storage devices are included in each control word source. A first control word storage unit 401 contains 2,560 storage locations arranged as twenty memories of 128 storage locations each. It is substantially the same as the storage arrangement of FIG. 3. This embodiment further includes a second word storage unit 402 which has 384 storage locations arranged as three memories of 128 storage locations each. All control words are separated in two categories. The first category comprises all control words associated with the subrate subscribers having the slowest data rate and all those having data periods which are integer divisibles of the data period of the slowest data rate. Also included in this first category are all control words associated with subscribers requiring one channel per frame. In the present example, the first category includes the following data rates: 2.4 kilobits per second, 4.8 kilobits per second, 9.6 kilobits per second, and 56 kilobits per second. Control words associated with subscribers having these data rates are stored in control word storage unit 401. The second control word storage unit 402 is used to store all control words associated with 16 kilobits per second data rate subscribers.

The control word storage units must be periodically read to provide control words for the control of switching functions and less frequently written to provide new communication paths or to abolish unneeded ones. To accommodate both reading and writing, each time slot is divided into a read half and a write half. Clock circuit 403 (FIG. 5) generates a square wave output on a conductor 409. Whenever the output of clock circuit 403 is a logical "1", a memory read occurs and whenever the output of clock circuit 403 is a logical "0" a memory write is possible. The process of reading the control word storage units is first described. Clock circuit 403 also generates and transmits a series of clock pulses to a time slot counter 404. Time slot counter 404 responds to the clock pulses by generating a recurring sequence of time slot designations, 0 through 127 at the rate of one designation per time slot. The time slot designations are directly applied to AND gates 405 and 406 and are applied to a modulo twenty counter 407 and a modulo three counter 408. Modulo twenty counter 407, which counts the frames in a super frame, starts with an output of zero which is incremented by one each transition from a time slot designation 127 to 0. Modulo twenty counter 407 continues to count each 127 to 0 time slot designation transition up to nineteen when it is reset to zero. Signals indicating the number of transitions counted by the modulo twenty counter 407 are transmitted to a 1 out of 20 decoder 410 which operates in the known manner to apply a logical "1" to a unique one of its twenty output conductors in response to each set of signals received from modulo twenty counter 407.

The twenty output conductors of 1 out of 20 decoder 410, are each applied as an input to an associated AND gate which AND gates are shown figuratively as a single AND gate 413. Modulo three counter 408 also counts the 127 to 0 time slot designation transitions and generates as output signals the recurring sequence 0, 1, 2. These output signals are applied to a 1 out of 3 decoder 411 which applies a logical "1" to a predefined one of three output conductors. Each output conductor of 1 out of 3 decoder 411 is connected as an input to an associated AND gate which AND gates are shown figuratively as a single AND gate 414. Clock circuit 403 further generates three timing signals: $t_1$, $t_2$, and $t_3$ shown in FIG. 7 in relation to the read-write signals on conductor 409. At $t_1$, the time slot designation then generated by time slot counter 404 is gated by an AND gate 405 to an address register 415 which is associated with control word storage unit 401. This time slot designation is also gated by AND gate 406 to an address register 416 which is associated with control word storage unit 402. At the same $t_1$ signal, the logical "1" output of 1 out of 20 decoder 410 is gated to a memory select circuit 417 and the logical "1" output of 1 out of 3 decoder 411 is gated to a memory select circuit 418 by AND gates 413 and 414, respectively. Each of the twenty output conductors of decoder 410 is uniquely associated with one memory of control word storage unit 401. Memory select circuit 417 responds to the particular output of decoder 410 having the logical "1" by enabling that memory to read the control word location defined in address register 415. Similarly, each of the three output conductors of 1 out of 3 decoder 411 is uniquely associated with one of the memories of control word storage unit 402. Memory select circuit 418 responds to the logical "1" from 1 out of 3 decoder 411 by enabling the selected memory to read the control word location defined by the content of address register 416. The current time slot count and the outputs of modulo twenty counter 407 and modulo three counter 408 are thus responsible each time slot for reading one control word from each of the control word storage units 401 and 402. The control word read from control word storage unit 401 is transmitted to an output register circuit 419 and the control word read from control word storage unit 402 is transmitted to an output register circuit 420.

In accordance with the above-described arrangement, one storage location control word storage unit 402 is read each time slot and its contents transmitted to output register circuit 419. The sequence of control words applied to output register circuit 419 is defined by reading sequentially all 128 storage locations of the first memory followed by the sequential reading of the 128 storage locations in each subsequent memory in sequence. This sequence is continued by reading the first storage location of the first memory immediately after reading the last storage location of the twentieth memory. The control word storage locations of control word storage unit 402 are read in similar fashion to the control word storage unit 401. During each time slot, control words are read from the same location in one memory of control word storage unit 401 and from one memory in control word storage unit 402 and transmitted to their associated output register circuits 419 and 420, respectively.

All storage locations in both control word storage units 401 and 402 include sixteen control digits and a busy/idle bit. The purpose of the busy/idle bit is to define whether the remaining portion of the accompanying control word is to be used in establishing a communication path or not. If the busy/idle bit is a zero, the control word location is defined to be idle and any control word portion in that location is defined not to be usable. Similarly, if the busy/idle bit is a logical "1", the control word storage location is determined to have the necessary information required to establish a communication path.

When the system of the present invention is first initialized, the busy/idle bits of all control word storage locations in control word storage units 401 and 402 are set to a logical "0", indicating them all to be idle. As meaningful control words are loaded into the two control word storage units, their associated busy/idle bits are set to logical "1" to indicate that the associated control word storage locations contain useful information. As will be described in greater detail later herein, control words are written into a storage location of control word storage unit 402 only when all twenty memories of control word storage unit 401 have idle, busy/idle bits in the same storage location. For example, if all twenty memories of control word storage unit 401 have idle location 13, a control word can be placed in location 13 of any of the three memories in control word storage unit 402. A control word selection circuit 425 which comprises AND gates 421, 422 and an OR gate 423 (FIG. 5) is employed to select one of the two control words read in each time slot. AND gates 421 and 422 and OR gate 423, although shown as single gates, are all actually sixteen gates, each being associated with one bit of a control word. The busy/idle bit of register 419 is applied as a control input to the AND gate 421. The busy/idle bit of output register circuit 420 is applied to AND gate 422 as a control input. The pulse generated by clock circuit 403 at time $t_2$ (FIG. 7) is applied to both AND gates 421 and 422. The control word in the particular one of output register circuits 419 and 420 having a logical "1" busy/idle bit will be gated to the switching network via an OR gate 423. Further, both of the busy/idle bits are applied as inputs to an exclusive OR gate 424. The output of exclusive OR gate 424 is applied as a busy/idle bit to the switching system to indicate if any action can be taken during the particular time slot of interest. No such action will be taken if the busy/idle bit is a logical "0".

A scanner circuit 119 (FIG. 1), in a manner well known in the art, accumulates service request information and call signaling information which it transmits to central processor 120. Although scanner 119 which detects digital signaling information from the time-multiplex lines is shown, signaling information could be obtained from incoming analog lines, if they were present, or from a common channel interoffice signaling link (CCIS) as is well known in the art. Central processor 120 performs translations based on the information accumulated by scanner circuit 119 and information stored in network status maps. The purpose of these translations is to locate a time slot through the switching network having sufficient capacity to handle the data rate of the subscribers requiring service and to develop a control word which will allow those subscribers to communicate during that time slot. The translation further involves locating control word storage locations which are separated by the required number of control words determined by the subscribers' data rate.

As previously stated, all control word storage locations initially have their associated busy/idle bit positions set to zero to show that the control word storage location is idle. When, due to requests for service it is necessary to write control words into the control word storage units, central processor 120 must determine if the data rate of the subscriber is in the first category associated with control word storage unit 401 or in the second category associated with control word storage unit 402. If the control word or words are to be stored in control word storage unit 401, they can only be placed in control word storage locations which are the same as a completely empty row of control word storage locations and control word storage unit 402. Similarly, if the control word is to be stored in control word storage unit 402, it can only be stored in control word storage locations which are the same as the completely empty row of control word storage locations in control word storage unit 401.

FIG. 8 shows the first five control word storage locations of control word storage units 401 and 402. The 0th control word storage locations in control word storage unit 401 (FIG. 8) is associated with a 56 kilobit per second subscriber $A_0$. Accordingly, the entire 0th row of control word storage unit 401 stores the control word $A_0$ and the entire 0th row of control word storage locations in control word storage unit 402 is idle. The 1th row of control word storage locations of control word storage unit 402 is associated with two 9.6 kilobit per second data rate subscribers $B_0$ and $B_1$. The 2th control word storage location of control word storage unit 402 is used by two 16 kilobit per second subscribers $C_0$ and $C_1$. Control words $C_0$ and $C_1$ associated with the subscribers are stored in the first and second memories of control word storage unit 402 at the 2th control word storage locations and all control word storage locations of control word storage unit 401 are idle in the 2th row. The next row of control word storage locations in control word storage unit 401 is utilized to store control words for a 56 kilobit subscriber $A_1$. If an additional 16 kilobit per second subscriber ($C_2$) requires connection through the switching system, control words associated therewith can be stored only in the shaded areas of the illustrated portions of control word storage unit 402 of FIG. 8. The control words for $C_2$ cannot be written into control word storage locations 0, 1, or 3 of control word storage unit 402 since valid control words are stored in these control word storage location rows in control word storage unit 401. Similarly if a subscriber of the first category requires connection through the network, control words associated therewith cannot be stored in the 2th storage location of control word storage unit 401 since this control word storage location is being utilized in control word storage unit 402.

The separation of data rates in the categories and the exclusive storage in two control word storage units on the basis of these categories of the present invention allows the switching for the data rates of our example using far fewer total control word storage locations than the prior art would suggest. Within each control word storage unit storage positions can be found for data rates associated with that control word storage unit having the proper number of time slots between them since the control word storage location rows are assigned in one control word storage unit to the exclusion of the other control word storage unit. Accordingly, proper spacing can be provided for control words associated with data rates of all expected categories. The following is a description of the process by which control words are written into the control word storage units 401 and 402. The switch controlling information generated by central processor 120 is transmitted to a selected control word source, e.g., input control word source 110, and stored in a register 412 located at that control word source (FIG. 4). Information from central processor 120 includes a control word and address information. Each register 412 includes a seven-bit memory definition portion 430 defining which control word storage location row is to store the control words stored in control word portion 432 of register 412. Register 412 also includes a twenty-bit memory definition portion 431 which is used to determine which of the memories, if any, of control word storage unit 401 are to store the control word portion 432 of register 412. Each of the twenty bit positions of memory definition portion 431 is uniquely associated with one of the memories of control word storage unit 401. Any of these memories associated with a bit position storing a logical "1" will receive the control word portion 432. Register 412 further includes a three-bit memory definition portion 433 which is used to determine which of the memories, if any, of control word storage unit 402 are to store the control word portion 432 of register 412. Each of the memories of control word storage unit 402 is uniquely associated with one of the bit positions of memory definition portion 433. It should be noted that the twenty-bit memory definition portion 431 and the three-bit memory definition portion 433 of register 412 are exclusive. That is, when the memory definition portion 431 defines a memory of control word storage unit 401 by including at least one logical "1" then no storage location is defined in memory definition portion 433, i.e., it contains all zeros. Similarly, if a memory is defined in memory definition portion 433, no memory will be defined in memory definition portion 431. At time $t_3$ the seven-bit memory definition portion 430 of register 412 is gated to address register 415 and address register 416 via AND gates 425 and 426, respectively. Also, the twenty-bit memory definition portion 431 of register 412 is gated to a memory select circuit 417 and the three-bit memory definition portion 433 is gated to the memory select circuit 418 via AND gates 427 and 428, respectively. Memory select circuits 417 and 418 respond to the information gated thereto by enabling those memories associated with a logical "1" to write the control words stored in control word portion 432 of register 412 into the storage location defined by the seven-bit memory definition portion 430.

The memories of control word storage unit 401 can be simultaneously written as can the memories of control word storage unit 402. If more than one logical "1" is placed in memory definition portion 431, the control word portion 432 will be written into each memory associated with a logical "1" at the control word storage location defined by memory definition portion 430. Accordingly, the FIG. 8 representation of the first control word storage location row of control word storage units 401 and 402 would be obtained by placing in register 412 an all-zero memory definition portion 430, an all-ones memory definition portion 431, a control word of $A_O$, and an all-zero memory definition portion 433. Similarly, the control words for subscriber $B_1$ (FIG. 6) could be stored in control word storage unit 401 by placing in register 412 an address portion defining row 1, a memory definition portion 431 of 01000010000100001000, a control word of $B_1$, and a memory definition portion 433 of all zeros. It should be noted that no write operation will be performed when both of the memory definition portions 431 and 432 contain all zeros since no memory will be selected by memory select circuits 417 or 418. Accordingly, register 412 is cleared to contain all zeros by the falling edge of each pulse $t_3$. Thus, a write operation will occur only during a memory cycle in which central processor 120 transmits a control word to register 412.

Communication paths are removed from the switching system by writing a control word having an idle busy/idle bit in all control word storage locations associated with the communication path to be removed. Accordingly, if the communication path for subscriber $A_1$ was no longer needed, the above-described memory writing arrangement would be used to simultaneously write a logical "0" busy/idle bit in each control word associated with subscriber $A_1$.

FIG. 6 is a more detailed diagram of the association of input data word distributor 114 and input buffer memory 105. Since all of the data word distributors of the present embodiment operate in a substantially identical manner, only one is described in detail herein. Input buffer memory 105, as previously stated, has sufficient capacity to store 2,560 data words. This storage space is divided into twenty memories, each having 128 data word storage locations. Each storage location in a given memory is uniquely associated with one channel each frame and each memory is uniquely associated with one frame of a super frame. Accordingly, the storage capacity is allocated such that only data words from subscribers sharing the first channel would be stored in the first storage location of any of the twenty memories, only data words in the second channel can be stored in the second storage location of any of the twenty memories, etc.

All data words on time-multiplex line 101 are sequentially placed in a data register 508. A synchronization circuit 501 is also connected to the incoming time-multiplex line 101 and derives timing signals to control the data word distribution from the signals on that time-multiplex line. Synchronization circuit 501 generates a recurring sequence of pulses, one being associated with each incoming channel on time-multiplex line 101. These pulses are transmitted to a channel counter 502, which generates digital signals representing the recurring numerical sequence 0 through 127. After channel 127 is counted, channel counter 502 is reset to zero and the count begins again. The output of channel counter 502 is transmitted to an address register 507 associated with all of the twenty memories of input buffer memory 105 and to a decoder circuit 503. Decoder circuit 503 is a 1 out of 128 decoder which responds to each channel designation from channel counter 502 by enabling a predefined 1 of 128 subrate counters of which subrate counter 504, associated with channel O, and subrate counter 505, associated with channel 127, are shown. Each subrate counter includes a register circuit and a counter which generate a recurring sequence from zero through s where s is the maximum number of subscribers sharing the incoming channel associated with that subrate counter. For example, if the subrate counter 504 were associated with 2.4 kilobit customers, its internal counter would generate the sequence zero through twenty every twenty frames. The output of the subrate counter selected by decoder circuit 503 is transmitted to a memory enable circuit 506. Memory enable circuit 506 is a 1 out of 20 decoder which responds to the count transmitted to it from the selected subrate counter by enabling one of the twenty buffer memories making up input buffer memory 105 to receive the data word presently in data register 508. In accordance with the above description, each incoming data word is stored in a location defined by the output of channel counter 502 in the particular one of the twenty buffer memories defined by the output of the subrate counter associated with that channel. A more detailed description of the read-write synchronism of the buffer memories, e.g., input buffer memory 105, is given in the previously mentioned J. W. Lurtz patent.

I claim:

1. A control word source for generating time-division switching system control words for controlling a time-division switching system comprising:
    first storage means comprising a first number of storage locations for storing control words;
    second storage means comprising a second number of storage locations for storing control words wherein said second number of storage locations is less than said first number of storage locations and said first number of storage locations is not an integer multiple of said second number of storage locations;
    storage reading means for substantially simultaneously reading the control words from one storage location of both of said first and said second storage means; and
    selection means responsive to the control words read from said storage means for transmitting to said time-division switching system, for control thereof, a predetermined one of said control words read from said first and said second storage means.

2. The control word source in accordance with claim 1 wherein each control word comprises a control portion and an associated busy/idle portion, said busy/idle portion being in a first state when its associated control portion is valid and in a second state when its associated control portion is not valid; and wherein said selection means responds to said busy/idle portions of said control words for transmitting to said switching system a control word associated with a busy/idle portion in the first state.

3. The control word source in accordance with claim 2 further comprising means for writing valid control portions and associated busy/idle portions in only one storage location and any two storage locations to be read substantially simultaneously by said storage reading means.

4. A time-division switching system comprising;

timing means for generating timing signals defining time slots of fixed duration;

a plurality of first data sources for generating data words at the rate of one data word every n time slots;

a plurality of second data sources for generating data words at the rate of one data word every m time slots where n is greater than m and n is not an integer multiple of m;

first storage means comprising n storage locations for storing control words;

second storage means comprising m storage locations for storing control words;

storage reading means for reading control words from one storage location of both of said first and said second storage means during each time slot;

selection means responsive to control words read from said storage locations for selecting one of said control words to be used by said switching system; and time-division switching means connected to said data sources and responsive to said control words selected by said selection means for establishing communication paths in said time slots of fixed duration.

5. The time-division switching system in accordance with claim 4 wherein each control word comprises a control portion and an associated busy/idle portion, said busy/idle portion being in a first state when its associated control portion is valid and in a second state when its associated control portion is not valid; and wherein said selection means responds to said busy/idle portions for selecting one of said control words associated with a busy/idle portion in the first state for controlling said time-division switching means.

6. The time-division switching system in accordance with claim 5 further comprising means for placing valid control portions and associated busy/idle portions in only one storage location of each two storage locations to be accessed during the same time slot.

7. The time-division switching system in accordance with claim 4 wherein said storage reading means comprises:

first reading means for repetitively reading all n storage locations of said first storage means in sequence at the rate of one storage location per time slot; and second reading means for repetitively reading contents of all m storage locations of said second storage means in sequence at the rate of one storage location per time slot.

8. A control word source for generating time-division switching system control words for controlling a time-division switching system comprising;

first storage means (401) comprising a first number of storage locations for storing control words, characterized in that said control word source further comprises second storage means (402) comprising a second number of storage locations for storing control words wherein said second number of storage locations is less than said first number of storage locations and said first number of storage locations is not an integer multiple of said second number of storage locations;

storage reading means (415, 416, 417, 418) for substantially simultaneously reading the control words from one storage location of both of said first and said second storage means; and selection means (425) responsive to the control words read from said first and said second storage means for transmitting to said time-division switching system, for control thereof, a predetermined one of said control words read from said first and said second storage means.

9. The control word source in accordance with claim 8 wherein each control word comprises a control portion (control) and an associated busy/idle portion (BI) said busy/idle portion being in a first state when its associated control portion is valid and in a second state when its associated control portion is not valid; and characterized in that said selection means responds to said busy/idle portions of said control words for transmitting to said switching system a control word associated with a busy/idle portion in the first state.

* * * * *